(12) United States Patent
Chai et al.

(10) Patent No.: US 8,655,810 B2
(45) Date of Patent: Feb. 18, 2014

(54) DATA PROCESSING APPARATUS AND METHOD FOR MOTION SYNTHESIS

(75) Inventors: Jinxiang Chai, College Station, TX (US); Inwoo Ha, Seoul (KR); Taehyun Rhee, Yongin-si (KR); Dokyoon Kim, Seongnam-si (KR); Huajun Liu, College Station, TX (US); Xiaolin Wei, College Station, TX (US)

(73) Assignees: Samsung Electronics Co., Ltd., Suwon-Si (KR); The Texas A&M University System, College Station, TX (US)

( * ) Notice: Subject to any disclaimer, the term of this patent is extended or adjusted under 35 U.S.C. 154(b) by 290 days.

(21) Appl. No.: 13/317,553

(22) Filed: Oct. 21, 2011

(65) Prior Publication Data

US 2012/0136817 A1    May 31, 2012

Related U.S. Application Data

(60) Provisional application No. 61/405,681, filed on Oct. 22, 2010.

(30) Foreign Application Priority Data

Nov. 12, 2010   (KR) ........................ 10-2010-0112549

(51) Int. Cl.
*G06F 17/00*   (2006.01)
*G06N 5/02*   (2006.01)

(52) U.S. Cl.
USPC .......................................................... 706/12

(58) Field of Classification Search
USPC .......................................................... 706/12
See application file for complete search history.

(56) References Cited

U.S. PATENT DOCUMENTS

| | | | | |
|---|---|---|---|---|
| 7,593,009 | B2 * | 9/2009 | Woo et al. | 345/419 |
| 7,598,951 | B2 * | 10/2009 | Lee et al. | 345/419 |
| 7,606,428 | B2 * | 10/2009 | Jang et al. | 382/232 |
| 7,626,590 | B2 * | 12/2009 | Ahn et al. | 345/582 |
| 7,830,380 | B2 * | 11/2010 | Ahn et al. | 345/428 |
| 7,903,111 | B2 * | 3/2011 | Lee et al. | 345/420 |
| 7,944,970 | B2 * | 5/2011 | Ahn et al. | 375/240.09 |
| 7,982,735 | B2 * | 7/2011 | Lee et al. | 345/427 |
| 7,995,065 | B2 * | 8/2011 | Tak et al. | 345/473 |
| 8,014,621 | B2 * | 9/2011 | Ahn et al. | 382/239 |
| 8,098,243 | B2 * | 1/2012 | Lee et al. | 345/419 |
| 8,134,552 | B2 * | 3/2012 | Lee et al. | 345/419 |
| 8,259,113 | B2 * | 9/2012 | Ahn et al. | 345/428 |

FOREIGN PATENT DOCUMENTS

| | | |
|---|---|---|
| JP | 2009-534774 | 9/2009 |
| KR | 10-2002-0022885 | 3/2002 |
| KR | 10-2002-0064094 | 8/2002 |
| KR | 10-2003-0085275 | 11/2003 |
| KR | 10-2010-0002803 | 1/2010 |
| KR | 10-2010-0072745 | 7/2010 |
| WO | 01/04055 | 1/2001 |

* cited by examiner

*Primary Examiner* — Michael B Holmes
(74) *Attorney, Agent, or Firm* — Staas & Halsey LLP

(57) ABSTRACT

A data processing apparatus is used for motion synthesis. A preprocessing unit of the data processing apparatus calculates a mixture of factor analysis (MFA) parameter by applying an energy minimized optimization algorithm to motion capture data acquired in advance and stored in a motion database (DB). When a motion probability distribution model is generated as described above, a calculating unit of the data processing apparatus synthesizes a motion corresponding to input motion sensing data by applying the input motion sensing data to the motion probability distribution model.

20 Claims, 7 Drawing Sheets

300

400

500

DATA PROCESSING APPARATUS AND METHOD FOR MOTION SYNTHESIS

CROSS-REFERENCE TO RELATED APPLICATIONS

This application claims the benefit of U.S. Provisional Patent Application No. 61/405,681, filed on Oct. 22, 2010 in the USPTO, and of Korean Patent Application No. 10-2010-0112549, filed on Nov. 12, 2010 in the Korean Intellectual Property Office, the disclosures of which are incorporated herein by reference.

BACKGROUND

1. Field

Example embodiments of the following description relate to a data processing apparatus and method for real-time synthesis of motion of a virtual character by sensing motion of a user, and more particularly, to a data processing apparatus and method capable of estimating and synthesizing motion of a 3-dimensional (3D) model, such as an avatar, in real time corresponding to a motion sensing operation when the motion sensing operation is performed.

2. Description of the Related Art

Recently, interest has been increasing in a technology for sensing motion of a target object, such as a human body, in real space and realizing the motion in a 3-dimensional (3D) space. Such a technology is generally applied to video games, computer graphics (CG) for movies, and the like. The above-mentioned technology, called motion estimation, motion capture, and the like, takes a long calculation time from sensing of motion to outputting results of motion capture.

In sensing and capturing motion of a human body, it may be considered that an increase in the number of sensors attached to the human body will proportionally increase the accuracy of result values. However, when a lot of sensors are used, the sensing process is complicated and restricted in various ways. For example, when a lot of sensors are attached to the human body, smooth motion of the human body may be hindered. Also, it may be bothersome to attach and remove the sensors.

Considering this, research is in progress to look for a method capable of sensing motion with a relatively small number of sensors and thereby capturing the motion. However, a decrease in the number of sensors may increase operational errors due to sensor noise.

Accordingly, there is a desire for an improved method capable of accurately performing on-line motion synthesis in real time using motion sensing results received from a relatively small number of sensors, while being robust to the sensor noise.

SUMMARY

According to example embodiments, there may be provided a data processing apparatus and method, capable of synthesizing a smooth and natural motion of an avatar in real time using a sensed motion of a user.

According to example embodiments, there may be also provided a data processing apparatus and method, capable of learning a compact motion by being robust to sensor noise and also capable of accurately synthesizing even a complicated motion.

The foregoing and/or other aspects are achieved by providing a data processing apparatus including a preprocessing unit to generate a motion probability distribution model by calculating a mixture of factor analysis by applying an energy-minimized optimization algorithm to motion capture data stored in a motion database; and a calculating unit to synthesize a motion corresponding to input motion sensing data by applying the input motion sensing data to the motion probability distribution model.

The motion database may store a plurality of motion capture data in advance and the preprocessing unit may include the motion database to store a plurality of motion capture data in advance; a mixture of factor analysis parameter calculating unit to calculate a mixture of factor analysis parameter through energy minimization optimization using the plurality of motion capture data; and a motion probability distribution modeling unit to generate the motion probability distribution model using the calculated mixture of factor analysis parameter.

The mixture of factor analysis parameter may be adapted to form pose distribution of the motion capture data stored in the motion database by combination of Gaussian models.

The motion probability distribution model may be a parametric pose model.

The data processing apparatus further includes a frame buffer to store a motion of at least one previous frame, the motion synthesized by the calculating unit, wherein the calculating unit reflects the motion of the at least one previous frame stored in the frame buffer when synthesizing the motion corresponding to the input motion sensing data of a current frame.

The calculating unit may use a model predictive control based motion optimization method when reflecting the motion of the at least one previous frame stored in the frame buffer.

The calculating unit may synthesize the motion corresponding to the input motion sensing data in real time, by applying the input motion sensing data to the motion probability distribution model.

The foregoing and/or other aspects are achieved by providing a data processing method including generating a motion probability distribution model by calculating a mixture of factor analysis parameter by applying an energy-minimized optimization algorithm to motion capture data stored in a motion database; and synthesizing a motion corresponding to input motion sensing data by applying the input motion sensing data to the motion probability distribution model.

The data processing method may further include storing a motion synthesized in at least one previous frame, wherein the synthesizing the motion reflects the stored motion of the at least one previous frame when synthesizing the motion corresponding to the input motion sensing data of a current frame.

The forgoing and/or other aspects are achieved by providing a data processing method including accessing motion capture data stored in a database; calculating a mixture of factor analysis parameter by applying an energy-minimized optimization algorithm to the accessed motion capture data; generating a motion probability distribution model based on the calculated mixture of factor analysis parameter; and applying input motion sensing data to the motion probability distribution model to synthesize a motion corresponding to the input motion sensing data.

The data processing method may further include adapting the calculating the mixture of factor analysis parameter to form pose distribution of the motion capture data stored in the database by combination of Gaussian models.

The motion probability distribution model may be a parametric pose model.

The data processing method may further include synthesizing the motion corresponding to the input motion sensing data in real time.

The forgoing and/or other aspects are achieved by providing a data processing apparatus including a database to store motion capture data; a first calculating unit to calculate a mixture of factor analysis parameter by applying an energy minimized optimization algorithm to the motion capture data; a motion probability distribution modeling unit to generate a motion probability distribution model based on the calculated mixture of factor analysis parameter; a sensor input receiving unit to produce input motion sensing data based upon poses of users in real time; and a second calculating unit to synthesize a motion of a virtual character corresponding to the input motion sensing data using the generated motion probability distribution model.

Additional aspects, features, and/or advantages of example embodiments will be set forth in part in the description which follows and, in part, will be apparent from the description, or may be learned by practice of the disclosure.

BRIEF DESCRIPTION OF THE DRAWINGS

These and/or other aspects and advantages will become apparent and more readily appreciated from the following description of the example embodiments, taken in conjunction with the accompanying drawings of which.

DETAILED DESCRIPTION

Figure 1:
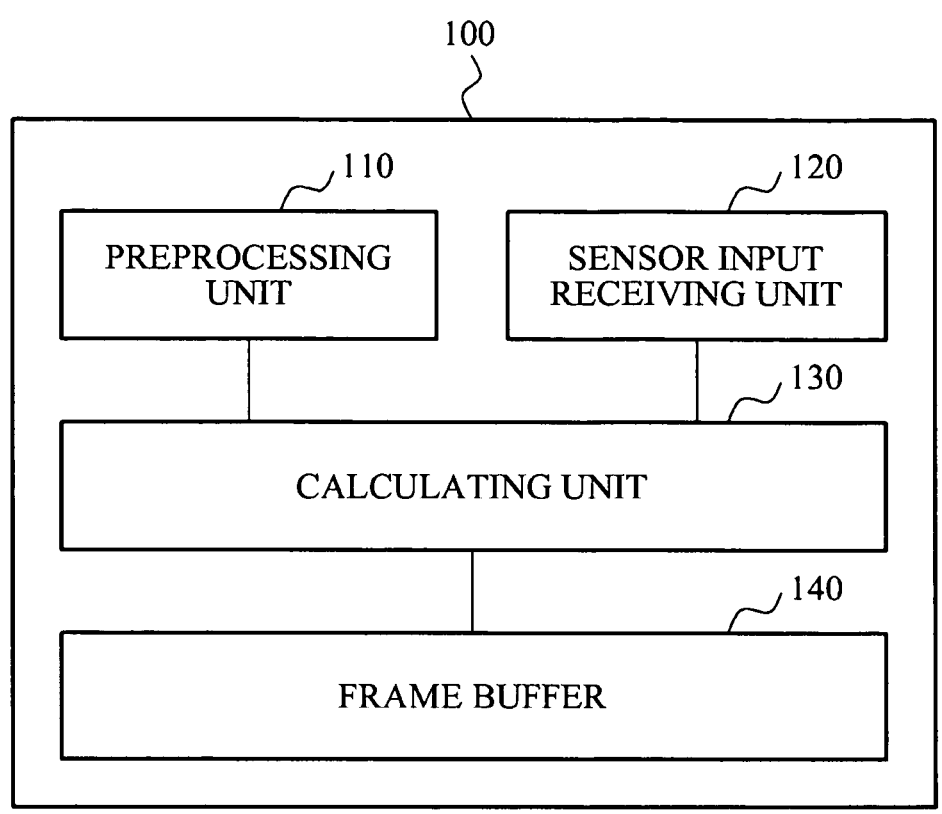
FIG. 1 is a block diagram of a data processing apparatus according to example embodiments.

Reference will now be made in detail to example embodiments, examples of which are illustrated in the accompanying drawings, wherein like reference numerals refer to like elements throughout. Example embodiments are described below to explain the present disclosure by referring to the figures.

FIG. 1 is a block diagram of a data processing apparatus 100, such as a computer, according to example embodiments. A preprocessing unit 110 of the data processing apparatus 100 may generate a motion probability distribution model using motion capture data configured by capturing various motions of a human body in advance. Processes of generating the motion probability distribution model by the preprocessing unit 110 will be described in further detail with reference to FIGS. 2 and 5.

When input motion sensing data generated by sensing poses of a user in real time is input to a sensor input receiving unit 120, a calculating unit 130 synthesizes a motion of a virtual character, the motion corresponding to the input motion sensing data, using the motion probability distribution model according to an energy minimization (EM) method. In this case, a motion synthesis result generated by the calculating unit 130 may be stored in a frame buffer in units of a frame. A plurality of the motion synthesis results stored in the frame buffer 140 may be used for motion synthesis of a next frame. Processes of the motion synthesis performed by the calculating unit 130 will be described in further detail with reference to FIGS. 4 and 5.

Figure 2:
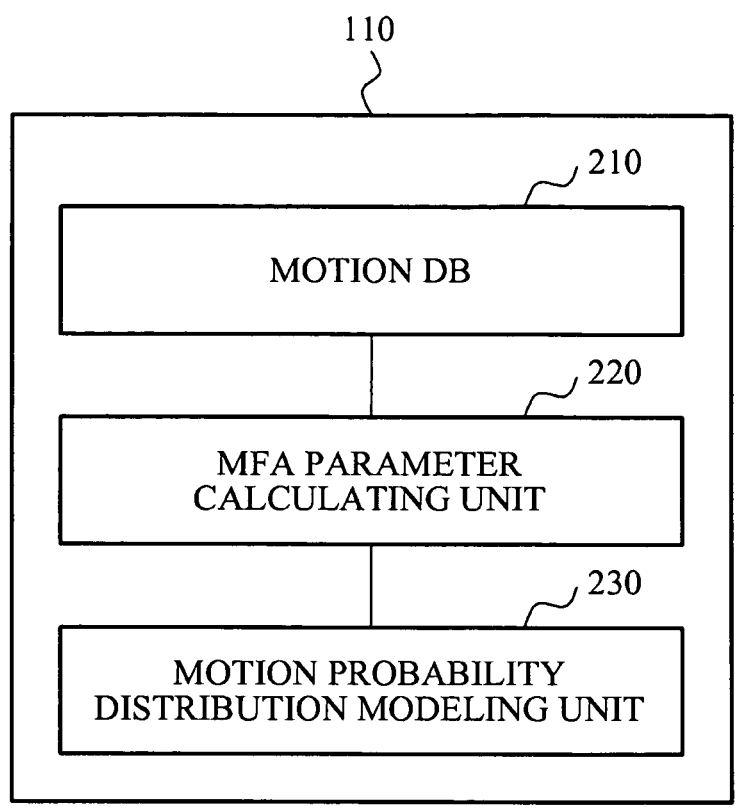
FIG. 2 is a diagram showing a detailed structure of a preprocessing unit of the data processing apparatus according to the example embodiments.

FIG. 2 is a diagram showing a detailed structure of the preprocessing unit 110 of the data processing apparatus 100 according to example embodiments. The preprocessing unit 110 of the data processing apparatus 100 may include a motion database (DB) 210 to store the motion capture data, a mixture of factor analysis (MFA) parameter calculating unit 220 to calculate an MFA parameter through EM optimization using the motion capture data, and a motion probability distribution modeling unit 230 to generate the motion probability distribution model using the calculated MFA parameter.

The motion capture data is generated by capturing motion in advance and storing the captured motion in the motion DB 210. Specifically, the motion capture data includes sensing values corresponding to various motions of the human body captured by a relatively large number of accurate sensors, for example, sensors having about at least 50 degrees of freedom (DOF). For example, the motion capture data may be generated by accurately measuring poses of the human body from at least one million frames. Therefore, the motion capture data may contain information on almost all poses that can be taken by the human body.

The MFA parameter calculating unit 220 may access the motion DB 210, and calculate the MFA parameter through EM optimization using the motion capture data. The MFA refers to a scheme to express pose distribution stored in the motion capture data of the motion DB 210 in the form of a parametric pose model configured by a linear combination of Gaussian models.

In the MFA scheme, the pose distribution of the motion capture data in the motion DB 210 may be expressed as a linear combination of a plurality of Gaussian functions. Also, distribution of skeleton poses of the human body, that is, skeleton pose distribution of the motion capture data may be understood as probability distribution.

The motion probability distribution modeling unit 230 may generate the motion probability distribution model that is, a nonlinear parametric pose model, using the calculated MFA. The motion probability distribution will be described in detail with reference to FIG. 5.

Figure 3:
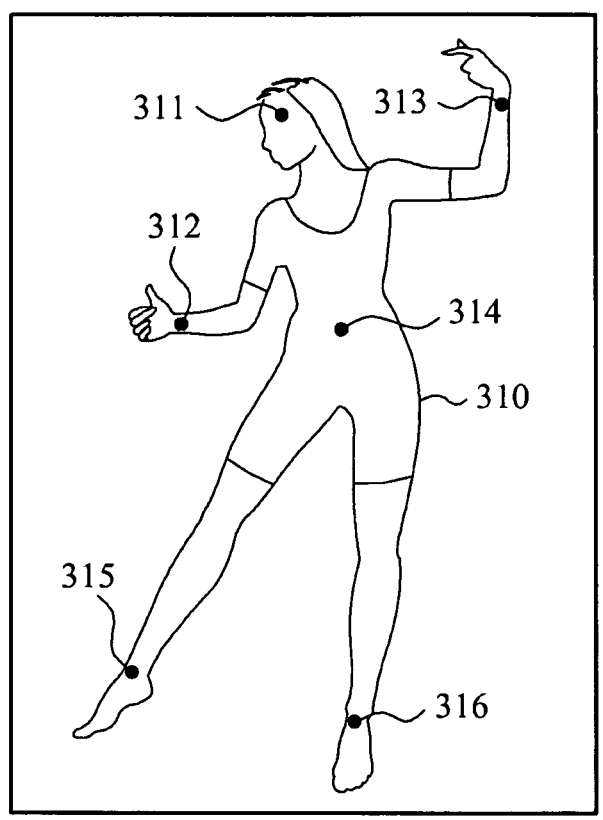
FIG. 3 is an image to explain processes of acquiring input motion sensing data, according to the example embodiments.

FIG. 3 is an image 300 to explain processes of acquiring input motion sensing data, according to the example embodiments. A motion is synthesized by reflecting a pose of a user 310 to the virtual character. More specifically, a plurality of pose markers, for example, pose markers 311 to 316 are attached to or worn by the user 310. A pose sensor (not shown) such as a camera recognizes positions of the pose markers 311 to 316 and transmits the input motion sensing data to the sensor input receiving unit 120 of the data processing apparatus 100.

The motion capture data stored in the motion DB 210 of FIG. 2 is accurately acquired by using more pose markers.

However, the present example embodiments employ relatively fewer pose markers, that is, the pose markers 311 to 316 for estimating a motion of the user 310 in real time, in order to minimize the inconvenience to the user 310.

Therefore, hereinafter, the processes of the data processing apparatus 100 that estimates the motion of the user 310 by receiving the input motion sensing data which is the result of recognizing the pose marker positions of FIG. 3 and synthesizes the estimated motion into a motion of the virtual character may be understood as a motion estimation calculation process using the motion probability distribution model explained in the previous embodiments.

Figure 4:
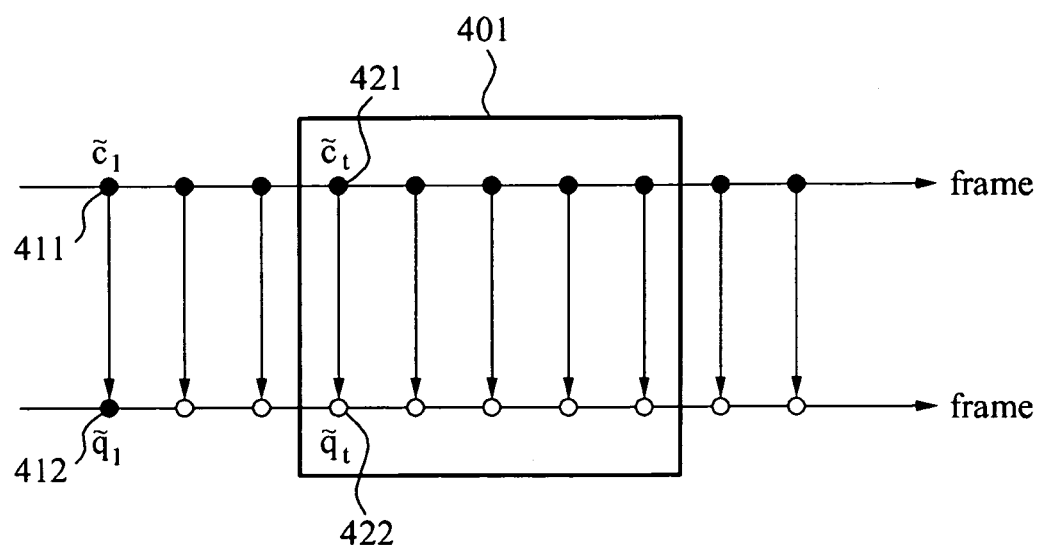
FIG. 4 is an image to explain processes of reflecting a motion synthesis result acquired from a previous frame to a motion synthesis result of a current frame, according to the example embodiments.

The motion synthesis process performed by the motion estimation calculation will be explained in detail with reference to FIG. 4. FIG. 4 is an image 400 to explain processes of reflecting a motion synthesis result acquired from a previous frame to a motion synthesis result of a current frame, according to the example embodiments.

The calculating unit 130 of the data processing apparatus 100 may synthesize the pose of the user 310 into the motion of the virtual character, by applying the input motion sensing data acquired in the process of FIG. 3 to the motion probability distribution model, using the EM method according to Equation 1 below.

$$argmin_{\tilde{q}_t} w_1 \|f(\tilde{q}_t; \tilde{s}, \tilde{z}) - \tilde{c}_t\|^2 +$$
$$w_2 \|\tilde{q}_t - 2\tilde{q}_{t-1} + \tilde{q}_{t-2}\|^2 - \sum_{k=1}^{K} \pi_k \mathcal{N}(q_{t+n} | \mu_k, L_k L_k^T + \psi)$$
[Equation 1]

Equation 1 is expressed as a linear combination of three terms.

In Equation 1, $w_1 \|f(\tilde{q}_t; \tilde{s}, \tilde{z}) - \tilde{c}_t\|^2$ is a control term to minimize a difference between a value 'q' denoting a pose and an angle, and a value 'c' denoting an input motion sensing value to thereby accurately reflect the sensor input of the user 310.

In Equation 1, values 's' and 'z' are parameters for calibration to increase accuracy. More specifically, the values 's' and 'z' are control parameters considering position differences among the pose markers 311 to 316 caused according to a figure or build of the user 310 before the motion synthesis calculation.

In addition, $w_2 \|\tilde{q}_t - 2\tilde{q}_{t-1} + \tilde{q}_{t-2}\|^2$ is a smoothness term to minimize variation of speed with respect to a motion of a previous frame, for smooth motion synthesis. Motions of previous frames may be temporarily stored in the frame buffer 140 to be used later.

In addition, $\Sigma_{k=1}^{K} \pi_k \mathcal{N}(q_{t+n}|\mu_k; L_k L_k^T + \psi)$ is a pose prior term reflecting the EM optimization using the MFA, which is a probability model synthesis method based on the motion DB, to achieve a natural motion.

The calculating unit 130 may search for a value 'qt' satisfying arg $\min_{\tilde{q}_t}$ Equation 1 indicating the linear combination of three terms, which refers to the motion synthesis process using the EM method.

As can be appreciated from the image 400 of FIG. 4, the motion synthesis results of the previous frames are used for motion synthesis of the current frame in the above calculation.

Motion synthesis results 412 calculated by the calculation unit 130 according to Equation 1 using motion sensing values 411 are continuously stored in the frame buffer 140. Motion synthesis results 422 of only a predetermined number of frames are stored. Therefore, the motion synthesis results being stored are removed according to a first in first out (FIFO) rule so that only the predetermined number of frames are stored.

The motion synthesis results 422 of a plurality of the frames, which are stored in the frame buffer 140 for later use, may be included in a frame window 401. Accordingly, input sensing values 421 and the motion synthesis results 422 in the frame window 401 may be used for motion synthesis of the current frame.

According to the above-described process, even when continuity between the previous frame and the current frame is not maintained due to sensor noise included in the input sensing values of the current frame, the synthesized motion of the virtual character may be maintained to be not greatly different from the motion synthesis result of the previous frame. Consequently, the overall motion synthesis calculation may be performed in a noise-robust manner while achieving a natural motion of the virtual character.

Figure 5:
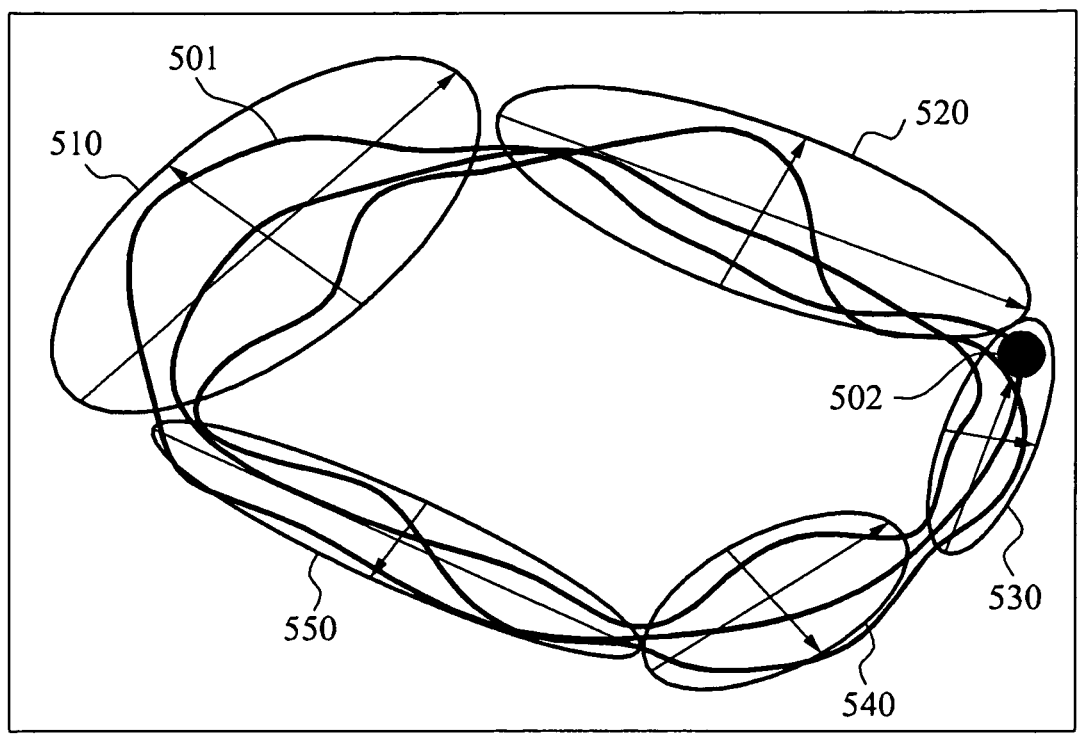
FIG. 5 is an image to explain processes of synthesizing a motion corresponding to motion sensing data according to a motion probability distribution model according to the example embodiments.

FIG. 5 is an image 500 to explain processes of synthesizing a motion corresponding to motion sensing data according to a motion probability distribution model according to the example embodiments. FIG. 5 shows a high dimensional pose locus 501 of the motion data acquired in advance and stored in the motion DB 210. The high dimensional pose locus 501 represents respective instances of human motion captured by accurately sensing a large number of frames. According to the example embodiments, the motion capture data is expressed by combination of a plurality of Gaussian functions and generated as the motion probability distribution model by the preprocessing unit 110. For example, Gaussian probability distributions 510 to 550 represent probability distribution of instant poses of an entire motion capture data. Therefore, the calculating unit 130 may synthesize a character motion 502 satisfying the EM of Equation 1, using the motion probability distribution model.

Figure 6:
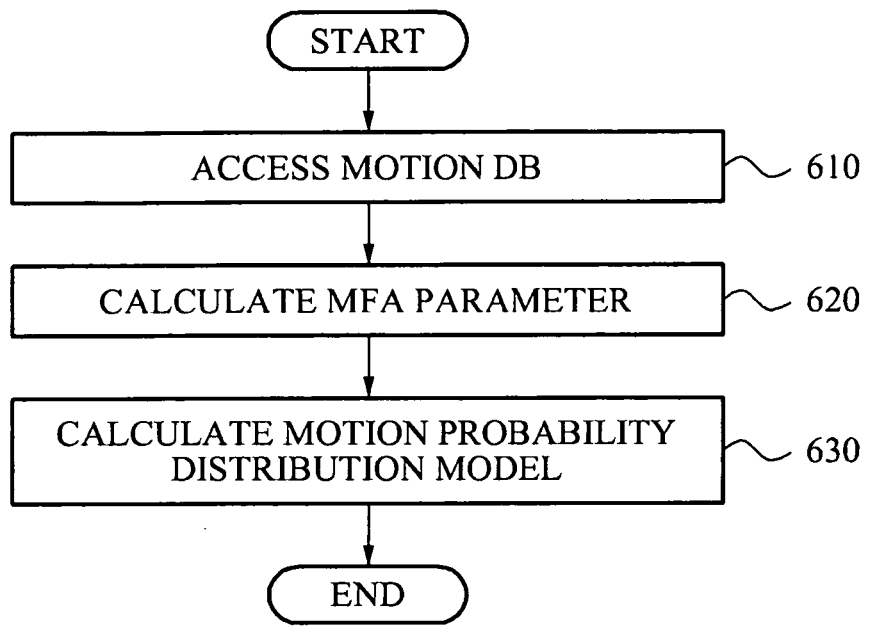
FIG. 6 is a flow chart for explaining an operation of the preprocessing unit that generates the motion probability distribution model in a data processing method according to example embodiments.

FIG. 6 illustrates a flow chart for explaining an operation of the preprocessing unit 110 that generates the motion probability distribution model in a data processing method according to example embodiments. In operation 610, the MFA parameter calculating unit 220 of the preprocessing unit 110 may access the motion DB 210 and read the motion capture data. In operation 620, the MFA parameter calculating unit 220 may calculate the MFA parameter through the EM optimization using the motion capture data. Accordingly, in operation 630, the motion probability distribution modeling unit 230 generates the motion probability distribution model which is the nonlinear parametric pose model, using the calculated MFA parameter. The process of generating the motion probability distribution model is already explained with reference to FIGS. 2 through 5.

Figure 7:
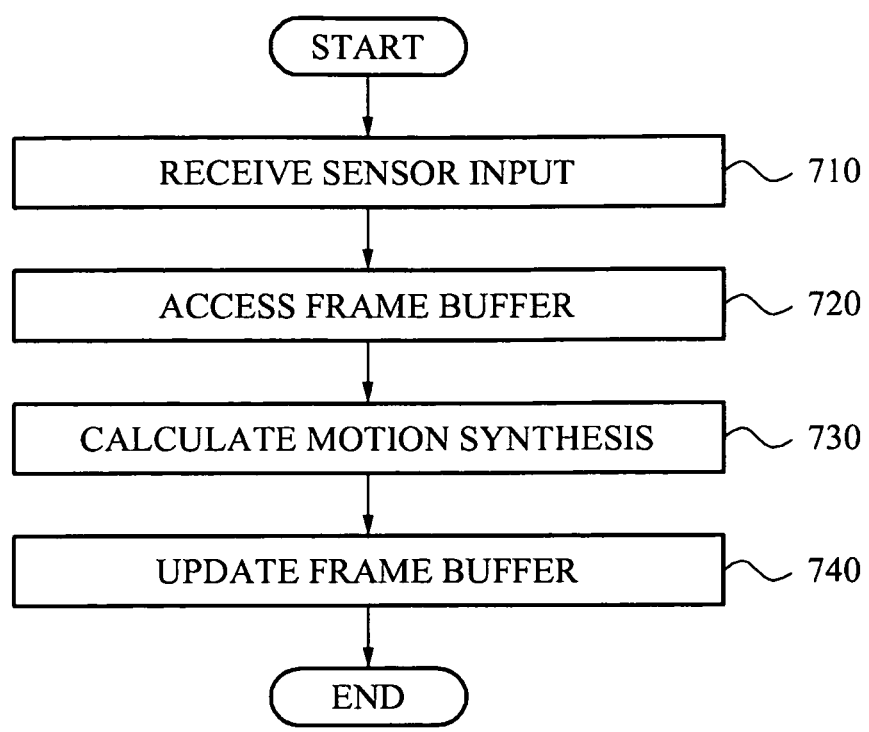
FIG. 7 is a flow chart for explaining processes of synthesizing the motion of the current frame using the motion synthesis result of the previous frame, according to the motion probability distribution model, in the data processing method according to the example embodiments.

FIG. 7 is a flow chart for explaining processes of synthesizing a motion of the current frame using the motion synthesis result of the previous frame, according to the motion probability distribution model, in the data processing method according to the example embodiments. In operation 710, the input motion sensing data generated by sensing poses of the user in real time is received by the sensor input receiving unit 10 of the data processing apparatus 100. The calculating unit 130 accesses the frame buffer 140 in operation 720, and reads the motion synthesis result of at least one previous frame. In operation 730, the calculating unit 130 synthesizes the motion of the virtual character corresponding to the input motion sensing data, according to the EM method using the nonlinear motion probability distribution model generated by the preprocessing unit 110.

The motion probability distribution model is generated by the preprocessing unit 110 as explained with reference to FIGS. 2 to 5. Synthesis of the motion of the virtual character is performed as explained with reference to FIGS. 1 to 4.

In operation 740, the calculating unit 130 stores the motion synthesis result with respect to the current frame in the frame buffer 140, thereby updating the frame buffer 140. The motion synthesis result thus stored may be used for motion synthesis of the next frame.

The methods according to the above-described example embodiments may be recorded in non-transitory computer-readable media including program instructions to implement various operations embodied by a computer. The media may also include, alone or in combination with the program instructions, data files, data structures, and the like. The program instructions recorded on the media may be those specially designed and constructed for the purposes of the example embodiments, or they may be of the kind well-known and available to those having skill in the computer software arts. Examples of non-transitory computer-readable media include magnetic media such as hard disks, floppy disks, and magnetic tape; optical media such as CD ROM discs and DVDs; magneto-optical media such as optical discs; and hardware devices that are specially configured to store and perform program instructions, such as read-only memory (ROM), random access memory (RAM), flash memory, and the like. The media may be transfer media such as optical lines, metal lines, or waveguides including a carrier wave for transmitting a signal designating the program command and the data construction. Examples of program instructions include both machine code, such as produced by a compiler, and files containing higher level code that may be executed by the computer using an interpreter. The described hardware devices may be configured to act as one or more software modules in order to perform the operations of the above-described example embodiments, or vice versa.

Although example embodiments have been shown and described, it would be appreciated by those skilled in the art that changes may be made in these example embodiments without departing from the principles and spirit of the disclosure, the scope of which is defined in the claims and their equivalents.

What is claimed is:

1. A data processing apparatus comprising:
   a preprocessing unit to generate a motion probability distribution model by calculating a mixture of factor analysis by applying an energy-minimized optimization algorithm to motion capture data stored in a motion database; and
   a calculating unit to synthesize a motion corresponding to input motion sensing data by applying the input motion sensing data to the motion probability distribution model.

2. The data processing apparatus of claim 1, wherein the motion database stores a plurality of motion capture data in advance, and wherein the preprocessing unit comprises:
   a mixture of factor analysis parameter calculating unit to calculate a mixture of factor analysis parameter through energy minimization optimization using the motion capture data; and
   a motion probability distribution modeling unit to generate the motion probability distribution model using the calculated mixture of factor analysis parameter.

3. The data processing apparatus of claim 1, wherein the mixture of factor analysis parameter is adapted to form pose distribution of the motion capture data stored in the motion database by a combination of Gaussian models.

4. The data processing apparatus of claim 1, wherein the motion probability distribution model is a parametric pose model.

5. The data processing apparatus of claim 1, further comprising a frame buffer to store a motion of at least one previous frame, the motion synthesized by the calculating unit,
   wherein the calculating unit reflects the motion of the at least one previous frame stored in the frame buffer when synthesizing the motion corresponding to the input motion sensing data of a current frame.

6. The data processing apparatus of claim 5, wherein the calculating unit uses a model predictive control-based motion optimization method when reflecting the motion of the at least one previous frame stored in the frame buffer.

7. The data processing apparatus of claim 1, wherein the calculating unit synthesizes the motion corresponding to the input motion sensing data in real time, by applying the input motion sensing data to the motion probability distribution model.

8. A data processing method comprising:
   generating a motion probability distribution model by calculating a mixture of factor analysis parameter by applying an energy-minimized optimization algorithm to motion capture data stored in a motion DB; and
   synthesizing a motion corresponding to input motion sensing data by applying the input motion sensing data to the motion probability distribution model.

9. The data processing method of claim 8, wherein the generating of the motion probability distribution model comprises:
   accessing a plurality of motion capture data stored in the motion database;
   calculating mixture of factor analysis parameter through energy minimization optimization using the plurality of motion capture data; and
   generating the motion probability distribution model using the calculated mixture of factor analysis parameter.

10. The data processing method of claim 8, wherein the mixture of factor analysis parameter is adapted to form pose distribution of the motion capture data stored in the motion database by combination of Gaussian models.

11. The data processing method of claim 8, wherein the motion probability distribution model is a parametric pose model.

12. The data processing method of claim 8, further comprising storing a motion synthesized in at least one previous frame,
   wherein the synthesizing the motion reflects the stored motion of the at least one previous frame when synthesizing the motion corresponding to the input motion sensing data of a current frame.

13. The data processing method of claim 12, wherein the synthesizing the motion uses a model predictive control-based based motion optimization method when reflecting the stored motion of the at least one previous frame.

14. The data processing method of claim 8, wherein the synthesizing the motion synthesizes the motion corresponding to the input motion sensing data in real time by applying the input motion sensing data to the motion probability distribution model.

15. A non-transitory computer readable recording medium storing a program to cause a computer to implement the method of claim 8.

16. A data processing method comprising:
   accessing motion capture data stored in a database;

calculating a mixture of factor analysis parameter by applying an energy-minimized optimization algorithm to the accessed motion capture data;

generating a motion probability distribution model based on the calculated mixture of factor analysis parameter; and applying input motion sensing data to the motion probability distribution model to synthesize a motion corresponding to the input motion sensing data.

17. The data processing method of claim 16, wherein the calculating the mixture of factor analysis parameter is adapted to form pose distribution of the motion capture data stored in the database by combination of Gaussian models.

18. The data processing method of claim 16, wherein the motion probability distribution model is a parametric pose model.

19. The data processing method of claim 16, wherein the applying comprises synthesizing the motion corresponding to the input motion sensing data in real time.

20. A data processing apparatus comprising:

a database to store motion capture data;

a first calculating unit to calculate a mixture of factor analysis parameter by applying an energy-minimized optimization algorithm to the motion capture data;

a motion probability distribution modeling unit to generate a motion probability distribution model based on the calculated mixture of factor analysis parameter;

a sensor input receiving unit to produce input motion sensing data based upon poses of a users in real time; and a second calculating unit to synthesize a motion of a virtual character corresponding to the input motion sensing data using the generated motion probability distribution model.

* * * * *

UNITED STATES PATENT AND TRADEMARK OFFICE
CERTIFICATE OF CORRECTION

| | | |
|---|---|---|
| PATENT NO. | : 8,655,810 B2 | Page 1 of 1 |
| APPLICATION NO. | : 13/317553 | |
| DATED | : February 18, 2014 | |
| INVENTOR(S) | : Chai et al. | |

It is certified that error appears in the above-identified patent and that said Letters Patent is hereby corrected as shown below:

In the Claims

Column 8, Line 56, In Claim 13, delete "based based" and insert -- based --, therefor.

Signed and Sealed this
First Day of July, 2014

Michelle K. Lee
*Deputy Director of the United States Patent and Trademark Office*